United States Patent
Fleytman

Patent Number: 6,148,683
Date of Patent: *Nov. 21, 2000

[54] WORM/WORM GEAR TRANSMISSION

[76] Inventor: Yakov Fleytman, 3233 Hickory Dr., Orion, Mich. 48359-1163

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/290,911

[22] Filed: Apr. 12, 1999

Related U.S. Application Data

[63] Continuation-in-part of application No. 08/732,150, Oct. 16, 1996, Pat. No. 5,992,259, and a continuation-in-part of application No. 08/796,466, Feb. 10, 1997.

[51] Int. Cl.$^7$ ........................................................ F16H 1/16
[52] U.S. Cl. ................................................ 74/425; 74/458
[58] Field of Search ............................... 74/425, 427, 458

[56] References Cited

U.S. PATENT DOCUMENTS

| | | | |
|---|---|---|---|
| 3,535,948 | 10/1970 | Winzeler | 74/440 |
| 3,597,990 | 8/1971 | McCartin | 74/425 |
| 3,711,910 | 1/1973 | Strejc | 407/25 |
| 3,875,635 | 4/1975 | Pavlov et al. | 29/893.31 |
| 3,895,700 | 7/1975 | Kerr | 192/41 R |
| 3,977,632 | 8/1976 | Walson | 244/60 |
| 4,047,449 | 9/1977 | Popov | 74/458 |
| 4,489,625 | 12/1984 | White | 74/665 N |
| 4,632,337 | 12/1986 | Moore | 244/17.19 |
| 4,685,346 | 8/1987 | Brackett | 74/427 |
| 4,697,476 | 10/1987 | Maxwell | 475/333 |
| 4,783,023 | 11/1988 | Jupe | 244/17.11 |
| 4,998,385 | 3/1991 | Umezono et al. | 451/47 |
| 5,018,403 | 5/1991 | Umezono et al. | 74/425 |
| 5,081,885 | 1/1992 | Shaffer | 74/640 |
| 5,647,790 | 7/1997 | Horiutchi | 451/474 |

OTHER PUBLICATIONS

Design of Industrial Double–Enveloping Wormgears (ANSI/AGMA–6030–C87).
Gear Geometry and Applied Theory by Faydor L. Litvin, P T R Prentice Hall, Englewood Cliffs, New Jersey 07632.
Software Strategies Magazine, dated Mar. 1996, p. 51.

*Primary Examiner*—Khoi Q. Ta

[57] ABSTRACT

A worm/worm gear transmission, particularly for use in a helicopter, and which includes an enveloping-type worm gear (3) having less than 24 teeth which are generated by an enveloping thread (1). The angle of one revolution of the thread has more than 15 degree. Different profiles of the worm gear are generated by a modified worm thread (9).

18 Claims, 13 Drawing Sheets

WORM/WORM GEAR TRANSMISSION

This is a continuation-in-part of Ser. No. 08/732,150 filed Oct. 16, 1996 now U.S. Pat. No. 5,992,259, issued Nov. 30, 1999 which is a continuation-in-part of U.S. Ser. No. 08/796,466, Filed Feb. 10, 1997 now allowed.

BACKGROUND OF THE INVENTION

1. Field of the Invention

This invention relates to speed reducers, and particularly those with very low ratios, and a unique transmission which is able to transmit higher torque levels and provide more efficient motion than prior art transmissions. This transmission could be applicable for use in a helicopter gear train.

Transmissions are utilized to transmit rotation for a variety of purposes. The term "transmission" as utilized in this application, does not specifically refer a vehicle transmission, although it would extend to such transmissions. Rather, this invention extends to any system wherein a source of movement is transmitted through a driving member to move a driven member. One potential applications for this transmission is a helicopter rotor drive. As is known, one of the biggest problem, associated with helicopter rotor drives is noise. When compared to conventional non-parallel shafts gear transmissions, worm/gear type transmissions generate minimum noise. However, low efficiency and torque capacity associated with prior art worm/worm gear transmissions prevented their use in helicopter power transmission systems.

2. Description of Prior Art

Worm/wormgear transmissions, in particular double enveloping speed reducers or Cone drive worm/worm gears, are well known in the mechanical power transmission field. The worm gear is driven by the rotation of the worm with which it meshes. The rotational speed of the associated shaft of the worm gear is a function of the number of teeth on the worm gear and the number of threads on the worm. The worm may be single or multiple threaded. The prior art worm/wormgear transmission had a worm gear with 24 or more teeth. In particular, the American National Standard "Design of Industrial Double-Enveloping Wormgears" (ANSI/AGMA -6030-C87) recommend 24 as the minimum number of gear teeth. Furthermore, the enveloping angle of any well-known worm for one revolution of it thread is not more than 15°.

In all standard double enveloping worm/worm gear transmissions, the enveloping worm gear has a surface that is generated by the profile of an enveloping thread of the worm. The term "Generated" describes how the profile of worm gear tooth can be defined. It could utilize mathematical calculations defining the profile from equations of the surface of the enveloping worm thread; hobbing of a gear blank by a tool, having the profile of the worm thread; or via computer modeling, where the profile of a 3D solid worm gear is cut by the profile of a 3D solid worm thread. Conventional enveloping worm/worm gear transmissions did not use worm gears with less than 24 enveloping type gear teeth due to the undercut on the root of the tooth. The enveloping angle of the worm is the angle of area contact between the threads on the worm and worm gear teeth. For a worm with one revolution of thread, the maximum number of engaging gear teeth is 2. As is known the enveloping thread angle can be calculated by equation $$\phi = 360°/N$$

Where N is the number of worm gear teeth.

Thus, for 24 teeth, $\phi_{24}=15°$. Likewise, for 12 teeth $\phi_{12}=30°$. This angle is also angular worm gear pitch.

If we use a two thread worm, then the enveloping angle should be twice as big. For example, an enveloping angle of a single thread worm for a worm gear with 6 teeth is 60 degrees while the enveloping angle of double thread worm for a worm gear with 6 teeth is 120 degree.

According to the Popov (U.S. Pat. No. 4,047,449) Patent, in order to increase the amount of tooth contact by increasing the number of teeth in actual contact, the enveloping angle should be bigger. However the Popov patent teaches of an enveloping angle which is still less than 15 degrees.

In all standards enveloping worm/worm gear transmissions, only a line contact exists between the worm thread and the worm gear teeth.

Moreover, standard double enveloping worm/worm gear transmissions have been used only for ratios of 5 and more. Due to such high ratios, is has been considered impractical to use the worm gear as the driven member and the worm as the driving member to transfer power from worm gear to worm.

The McCartin patent (U.S. Pat. No. 3,597,990) discloses a transmission with enveloping worm meshed with threaded followers. Thus, the McCartin gear with threaded followers is not able to have an envelope profile. Profiles of standard enveloping worm gear teeth usually have a profile generated by hobbing. However, the McCartin thread followers could not be made by hobbing or by generation of the worm thread profile. However, the McCartin drive is used for indexing motion and does not have a self-lock feature. McCartin patent can use one thread with more than two revolutions for accurate indexing. McCartin has line of contact in the middle of output rotary member. For one revolution of thread the McCartin device has a contact ratio of less than one which, in most applications is not practical. In McCartin patent, the enveloping of output rotary member (thread followers) is not possible and therefore the design has limited capacity. Finally the McCartin patent has ratatable members, which rotate very fast because their diameter is smaller than the pitch diameter of the worm. As such, these ratatable members have low reliability, are more expensive and produce extra noise.

In the Winzeler patent (U.S. Pat. No. 3,535,948), it is a split type worm gear that eliminates backlash by two halves involved in transferring torque.

SUMMARY OF THE INVENTION

Enveloping worm/worm gear transmissions having less than 24 enveloping type of the gear worm teeth, have not be commercially used since it was not possible to build due to undercut on the root of the worm gear tooth. Up to now, those skilled in the art were skeptical that an enveloping type worm gear with less than 24 teeth was unworkable or presented an insurmountable barrier. In contrast, the enveloping worm/worm gear transmission of the present invention utilizes a worm gear without undercut gear teeth because of greater enveloping angle for one revolution of the worm thread. With less than 24 gear teeth and, a greater enveloping angle for one revolution of the thread, as compared to prior enveloping worm/worm gear transmissions, the minimum ratio for one thread could be reduced to 2, with an achieved efficiency for this invention of up to 99%. In contrast, prior enveloping worm/worm gear transmission had minimum ratio of 24 for one thread of worm and a ratio of 5 for five threads of worm. The efficiency of new worm/worm gear transmission is even greater than in well-known hypoid gearing, which used in low ratio right angle drives. Thus, invention can replace hypoid or bevel gearing in many applications by reason of the low ratio. In addition, this new worm/worm gear transmission is able to back drive by transmitting torque from the worm gear to the worm. For the same size, this invention has more than twice the capacity of traditional hypoid gearing. If the invention were in fact obvious, because of its advantages, those skilled in the art surely would have implemented it by now. The fact that those skilled in the art have not implemented this invention despite its great advantages indicates that it was not obvious.

In this application, it is a possible to have "surface to surface" contact between the worm gear teeth and the worm thread, thereby increasing the torque capacity of the enveloping worm/worm gear transmission. This became feasible when the enveloping angle for one revolution of worm thread is more than 15 degrees, or even 30 degree. In all standard enveloping worm/worm gear transmissions (Faydor Litvin 1994, Gear Geometry and Applied Theory. PTR Prentice Hall, Englewood Cliffs, N.J.), and in previously discussed McCartin patent only line contact between thread and worm gear teeth or thread followers has been possible. This physical distinction has realized new and unexpected result.

In this patent application, the worm can be half or less than half of a split worm, which can have only one supporting shaft. Further in this patent application, the worm gear can be half or less than half of a split worm gear, which can have only one supporting shaft. Using only half or less than a half of the split worm gear or worm enables easier assembling of the worm with the worm gear.

In addition to the above new and unexpected results, applicant submits that additional reasons militate in favor of patentability, as follows:

The present invention is a crowded art. Two main fields of use for this new type of enveloping worm/worm gear transmission are: (a) gears transmissions with high efficiency torque transfer, (b) self-locking drives for applications with different types of brake or clutch functions. Conventionally, spur gears have been used in many mechanical transmissions, because of high efficiency. Now this invention could replace gears in traditional transmissions with right angles or parallel shafts.

This invention is contrary to the teachings of the prior act. That is, the invention goes against the law of the prior art about minimum number of worm gear teeth in enveloping worm/worm gear transmission with enveloping type of worm gear.

DRAWING FIGURES

FIG. 21 shows 3D picture of the wormgear with six teeth with spots on the surface from the contact with the worm in mesh.

| Reference Numerals in Drawings | |
|---|---|
| 1 enveloping worm for worm gear with three teeth. | 5 enveloping worm for worm gear with six teeth. |
| 2 screw thread for worm gear with three teeth. | 6 screw thread for worm gear with six teeth. |
| 3 enveloping type of worm gear with three teeth. | 7 enveloping type of worm gear with six teeth. |
| 4 drive shaft. | 11 worm gear drive shaft |
| 8 enveloping worm with shortened thread for worm gear with six teeth. | 12 enveloping worm in off-center position with shortened thread for worm gear with six teeth. |
| 9 enveloping shortened thread for | 13 enveloping shortened thread |

-continued

Reference Numerals in Drawings

| | |
|---|---|
| worm gear with six teeth. | for worm gear with six teeth for worm in off-center position. |
| 10 enveloping type of worm gear with six teeth with surface generated by shortened enveloping thread. | 14 enveloping type of worm gear with six teeth with surface generated by shortened enveloping thread from enveloping worm in off-center position. |
| 15 modified enveloping worm gear | 16 supporting worm drive shaft from one its side |
| 17 additional enveloping worm with shortened thread for worm gear with six teeth | 17 supporting worm gear shaft from one its side |
| 18 additional enveloping shortened thread for worm gear with six teeth | 20 worm gear |
| 19 additional drive shaft | 24 additional worm |
| 23 drive shaft | 25 thread of additional worm |
| 22 additional enveloping shortened thread for worm gear with six teeth | 26 thread |
| 27 worm | 28 worm gear |
| 29 enveloping worm gear with six teeth | 30 enveloping worm with two threads |
| 31 worm gear with ten teeth | 32 one thread modified worm |
| 33 modified worm gear with nine teeth | 34 modified enveloping worm with three threads |
| 35 steel worm gear with six teeth | 36 steel worm with two threads |
| 37 worm gear with six teeth | 38 enveloping worm with two threads |
| 39 hypoid gear (teeth not shows) | |

DETAILED DESCRIPTION OF THE INVENTION

Figure 1:
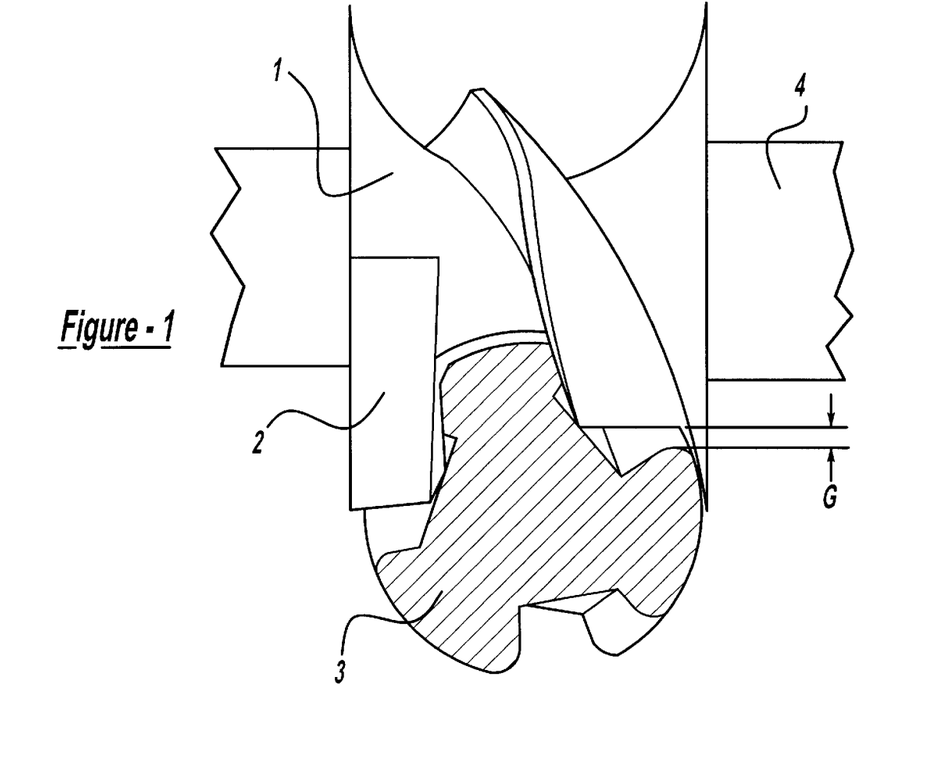
FIG. 1 is a cross-sectional view of a worm/wormgear transmission with 3 teeth incorporating the present invention.

On embodiment of a worm/worm gear transmission of the present invention is illustrated in FIG. 1. The transmission has an enveloping type worm 1 with at least one screw thread 2. Thread 2 is engaged by at least one tooth of an enveloping type worm gear 3 having three teeth. As shown in FIG. 1, enveloping worm 1 has a single thread 2 in a preferred embodiment and worm gear 3 has three teeth spaced about its circumference. As shown, a gap "G" exists between any tooth on worm gear 3 and threads on enveloping worm 1. Worm gear 3 and worm 1 are enclosed in the housing (not shown). Usually, the housing is made from metal and forms a reservoir for a lubricant to both lubricate and cool the gears, bearings, and seals for the unit. The housing forms a rigid support to mount the gears, bearings, seals and their associated parts (not shown). Worm 1 wraps around worm gear 3, and enveloping worm gear 3 also wraps around worm D. The minimum ratio between the number of teeth on worm gear 3 and the one thread on worm 1 is 2 (two). Apposite, by rotation of worm gear 3, worm 1 rotates with higher speed.

The reason for using enveloping-type of worm gear is that this type of worm gear has natural profile of tooth surface which is distinct from other types of thread followers. When the worm gear teeth are generated by threads of the worm having different lengths for the same enveloping angle (shortened), the profile of the worm teeth is different. The main advantage for using enveloping-type of worm gears is more capacity. For better torque capacity, enveloping-type of worm gear could have different enveloping angle. Adding envelope to the worm gear is necessary only for the bigger capacity, but in most applications it is enough to have only enveloping worm.

Figure 2:
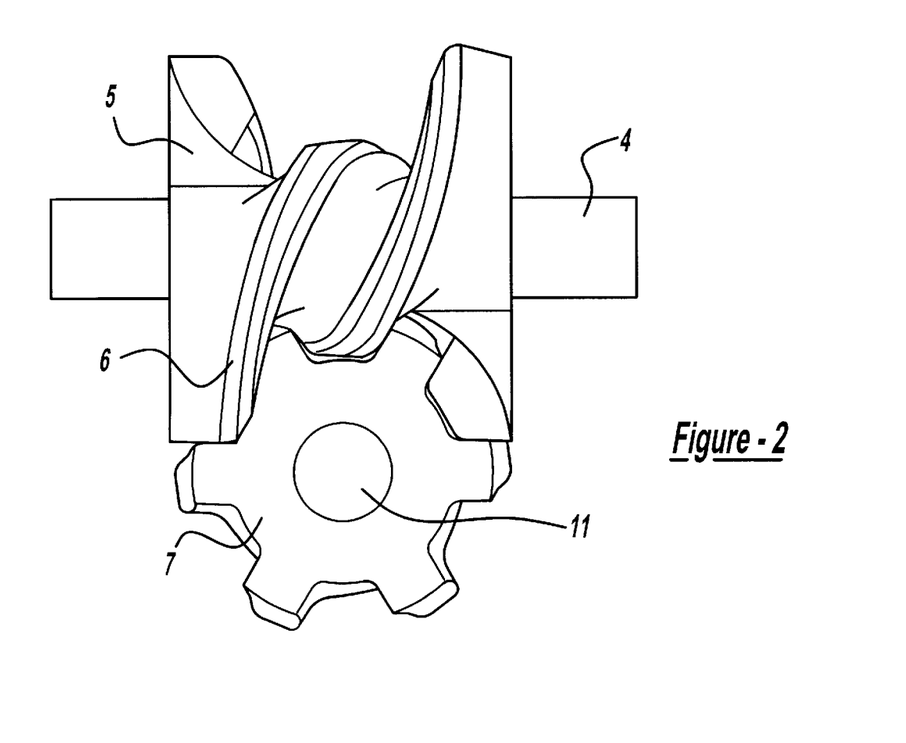
FIG. 2 is a view of a worm/wormgear transmission with 6 teeth incorporating the present invention.

Another embodiment of the worm/worm gear transmission of the present invention is illustrated in FIG. 2. This transmission has an enveloping-type worm 5 with two identical screw threads 6. These threads 6 are engaged by at least one tooth of an enveloping-type worm gear 7 having six teeth. Worm gear 7 is connected to a drive shaft 11.

Figure 3:
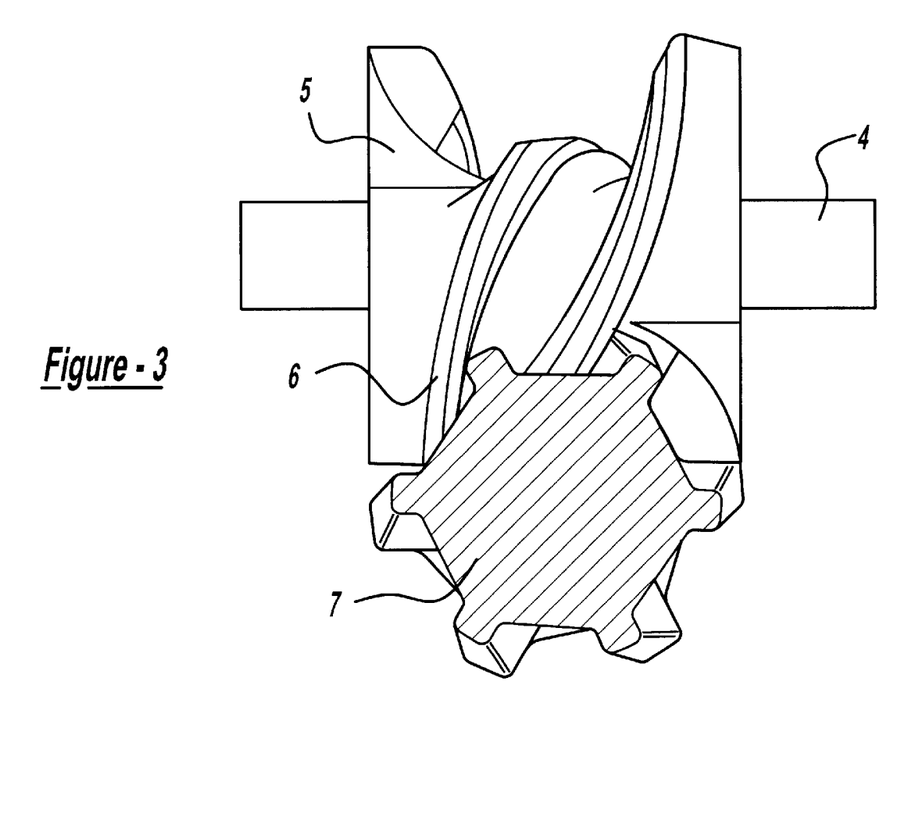
FIG. 3 is a view of worm with cross-sectional view of worm gear.
Figure 4:
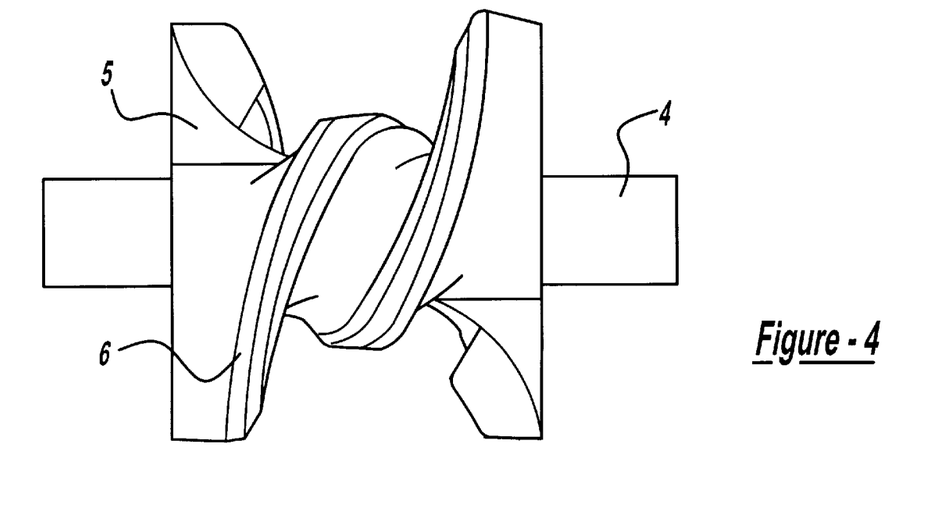
FIG. 4 is a view of an enveloping worm with thread for generation of profile of worm gear.

In FIG. 3 worm gear 7 is shown in cross-section as having a different profile compared to that shown in the front view of FIG. 2. FIG. 4 is a view of enveloping worm 5 with two identical threads 6 and supporting shaft 4.

Figure 5:
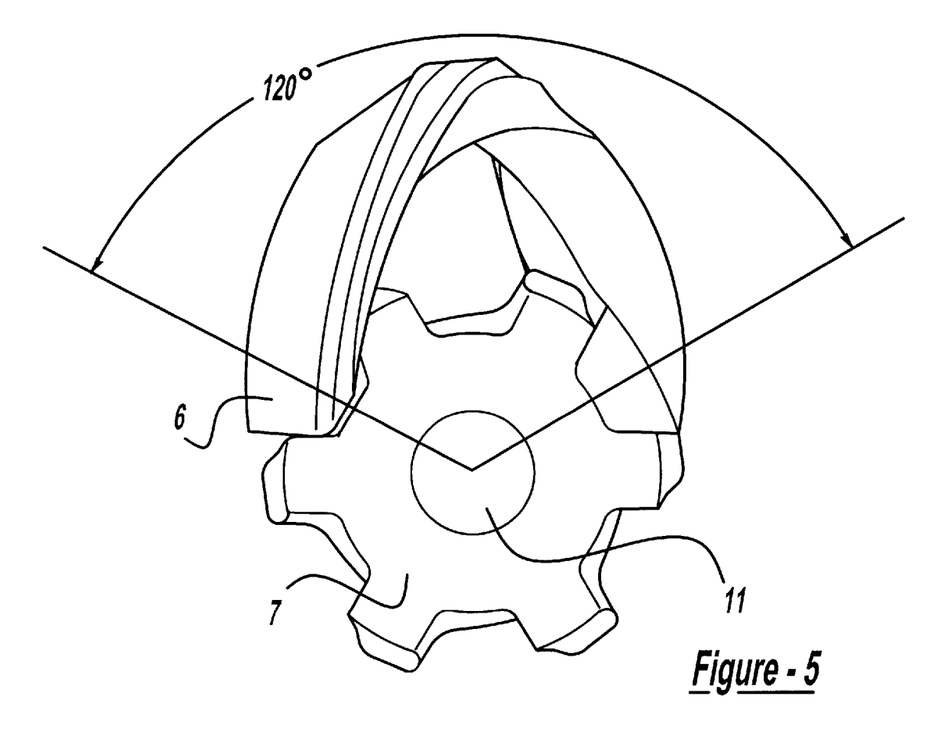
FIG. 5 is a view of an enveloping thread for generation of profile of worm gear.
Figure 6:
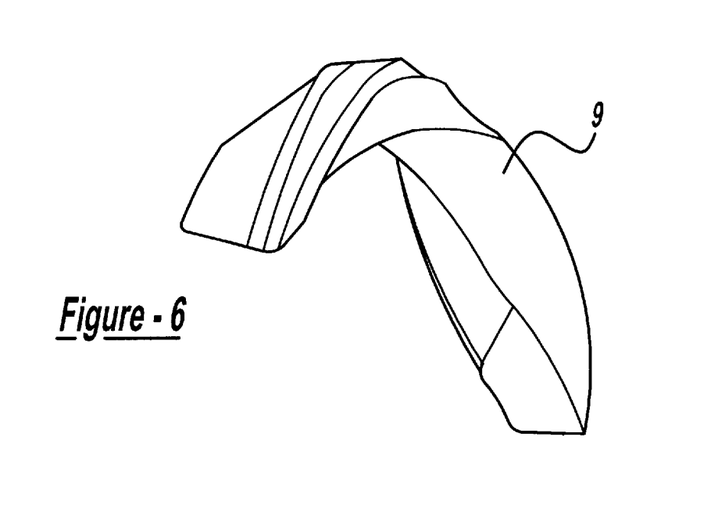
FIG. 6 is a view of shortened thread for generation of profile of worm gear.
Figure 7:
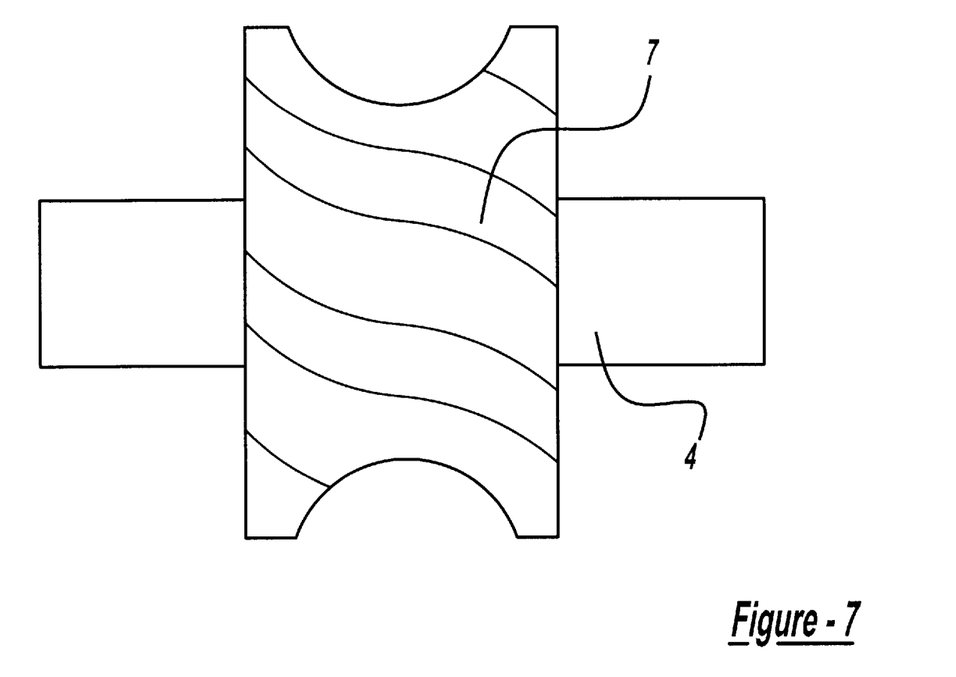
FIG. 7 shows an enveloping worm gear.
Figure 8:
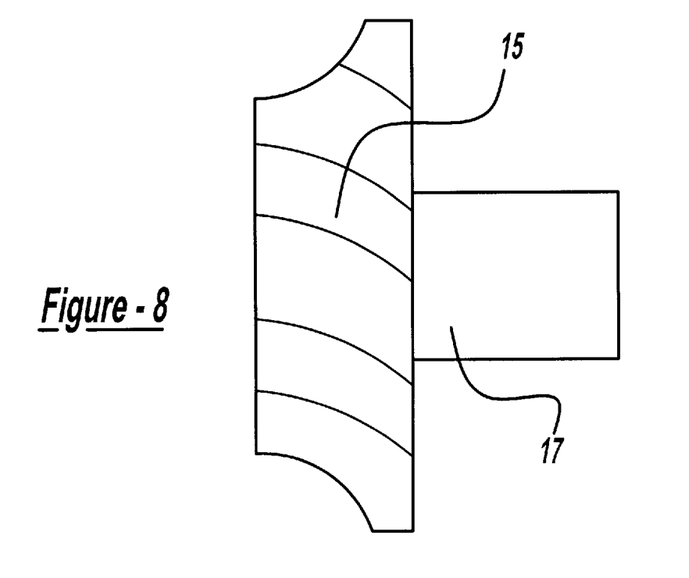
FIG. 8 shows a cross-sectional view of a modified worm gear with driving shaft having support from one side of worm gear.

FIG. 5 shows an enveloping angle of 120 degree for enveloping worm thread 6 that is used for generation of the six teeth on worm gear 7. This enveloping worm thread 6 has one revolution of thread or 360 degree of revolution around axis of it rotation. For illustration of one revolution for enveloping worm thread we could use this example. Worm thread's ends have the same cross-sections but could be placed from one position to another position, which is distinct 120 degree. This is possible by movement of the cross-section of the worm from one end along worm thread 6 to another end. In this case, the cross-section will rotates 360 degree around axis of rotation for shaft 4. FIG. 6 shows a worm thread 9 for generation of worm gear teeth, and which is shortened portion of thread having enveloping angle of 120 degrees. FIG. 7 shows enveloping worm gear 7 with six teeth. FIG. 8 shows enveloping worm gear 15 wherein worm gear 15 is modified from worm gear 7 by shortening along it axis of rotation around drive shaft 17. Practically, the worm gear could be longitudinally split into two halves and using only one shortened part or generated worm gear from blank, which already shortened. Modified worm gear 15 is easy to assemble in a single reduction unit. This is very important for gears with small pressure angle, when difficult to assemble enveloping worm 5 with enveloping type of worm gear 7. For many applications only the modified worm gear is enough. The enveloping worm gear could connect to drive shaft 17 supporting worm gear 15 from one side.

The bodies of the two modified enveloping worm gears 8 and 17 have axially extending end flanges that hook underneath flanges of adjacent collars to hold the worms in place. One or both of the worms bodies are keyed or otherwise fastened to the shaft for driving or driven. Relatively slight longitudinal movement of one or both worms disassembling the entire worm gear—collars—shaft assembly.

In the present invention, it is preferred that the ratio of the number of teeth on worm gear 1 relative to the number of threads on worm 2 is 11 to 1 and less. Most preferably, the ratio is three or even less, as shown. It is possible that only two teeth need to be utilized on worm gear 1. Worm/worm gear transmission used in the present application could also self lock.

The term "self-locking" as it is utilized in this application to describe the inventive worm and worm gear combinations, means that the teeth of the worm gear, when in contact with the thread of the worm, are capable of rotating the worm about the axis of the worm gear.

Figure 9:
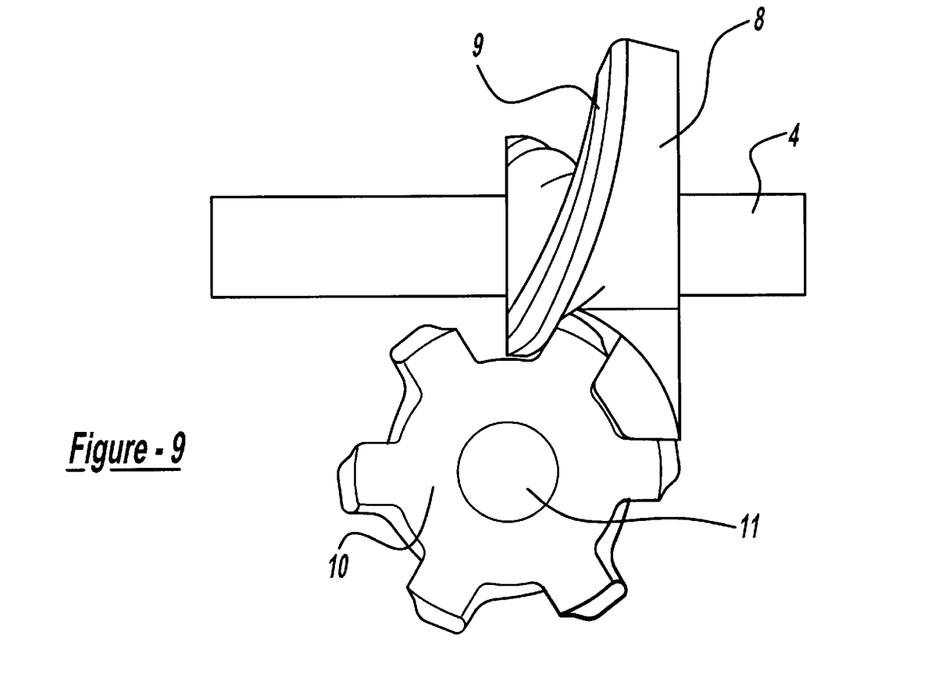
FIG. 9 shows a view of a worm/wormgear transmission with modified worm.
Figure 15:
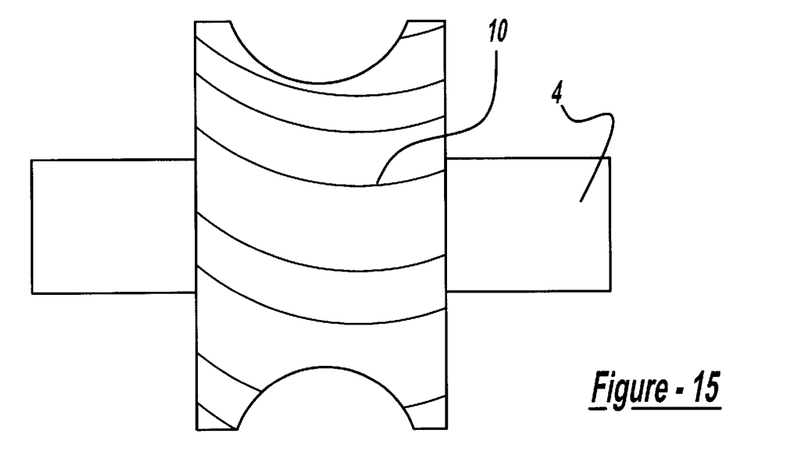
FIG. 15 shows an enveloping worm gear with different profile of teeth.

The teeth do not slip on the thread causing the thread to rotate about its own axis. By carefully selecting the material of the respective teeth and threads, and the respective angles, a worker of ordinary skill in the art would be able to achieve this goal. FIG. 9 shows view of the shortened enveloping worm 8 with enveloping type of worm gear 10, which has different profile of the teeth, compare to teeth of the worm gear 7 even for the same number of worm gear teeth. It is because this profile was generated by shortened enveloping thread 9. FIG. 15 is a side view of worm gear 10.

Figure 10:
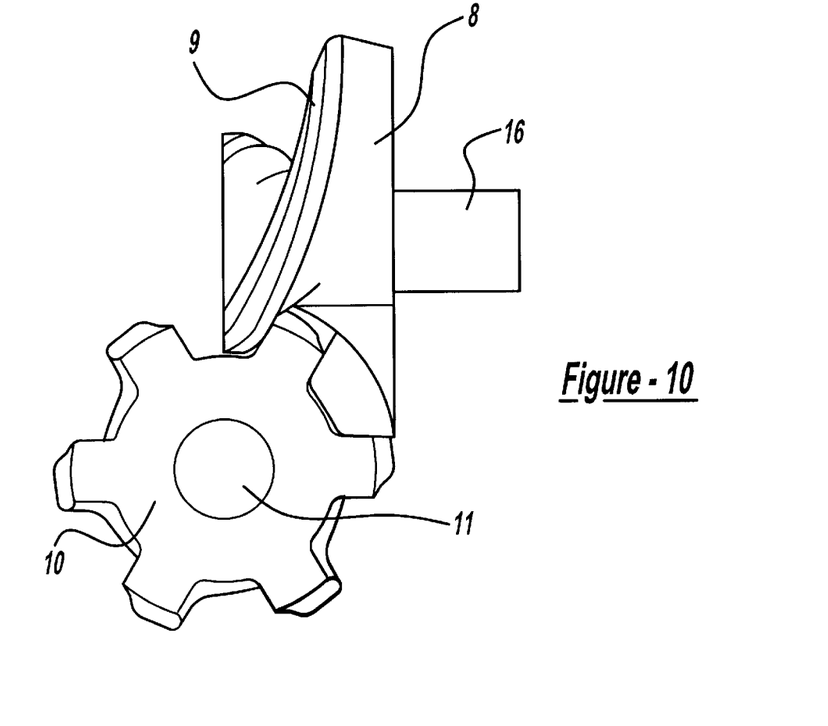
FIG. 10 is a cross-sectional view of worm with driving shaft having support from one side of worm.
Figure 11:
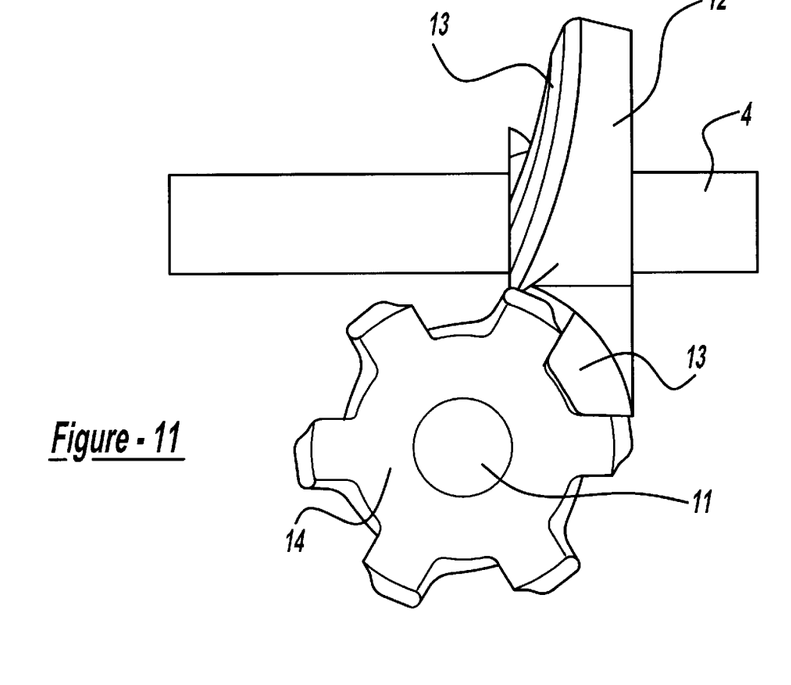
FIG. 11 shows a view of a worm/wormgear transmission with modified worm in off-center position.

In FIG. 10, enveloping worm 8 is connected to drive shaft 16 which supports worm 8 from one its side. FIG. 15 shows a view of a worm/wormgear transmission with modified worm is in an off-center position relative to enveloping-type worm gear 14.

Figure 12:
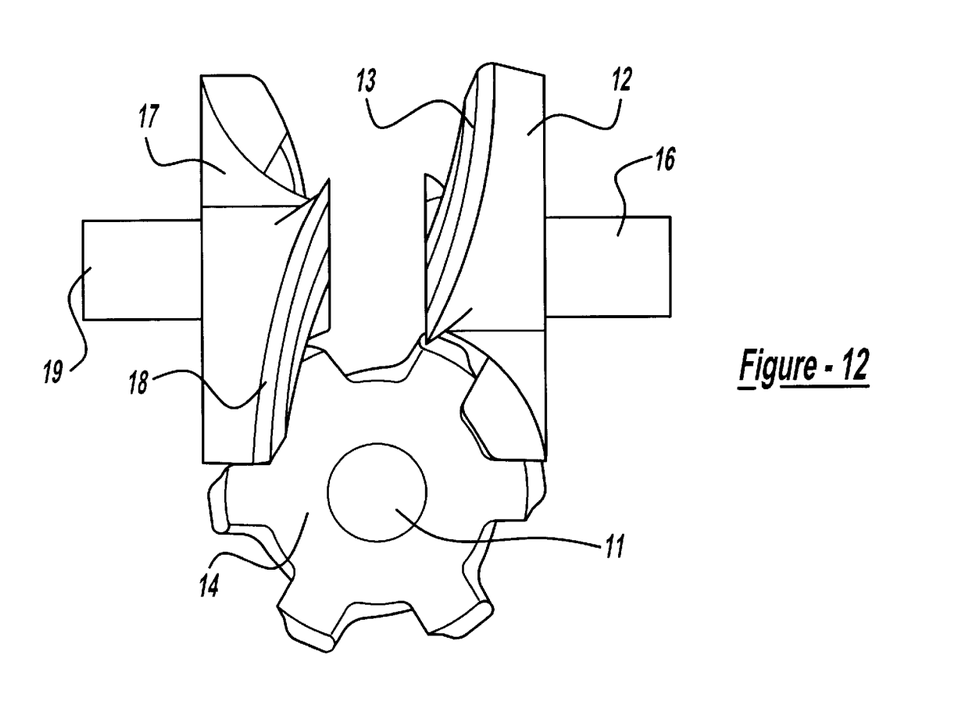
FIG. 12 shows a view of a worm/wormgear transmission with two modified worms in off-center position.

FIG. 12 shows a view of a worm/wormgear transmission with two modified worms 12 and 17 in off-center positions and respectively connected to different drive shafts 16 and 19 and worm gear 14.

Figures 13, 14:
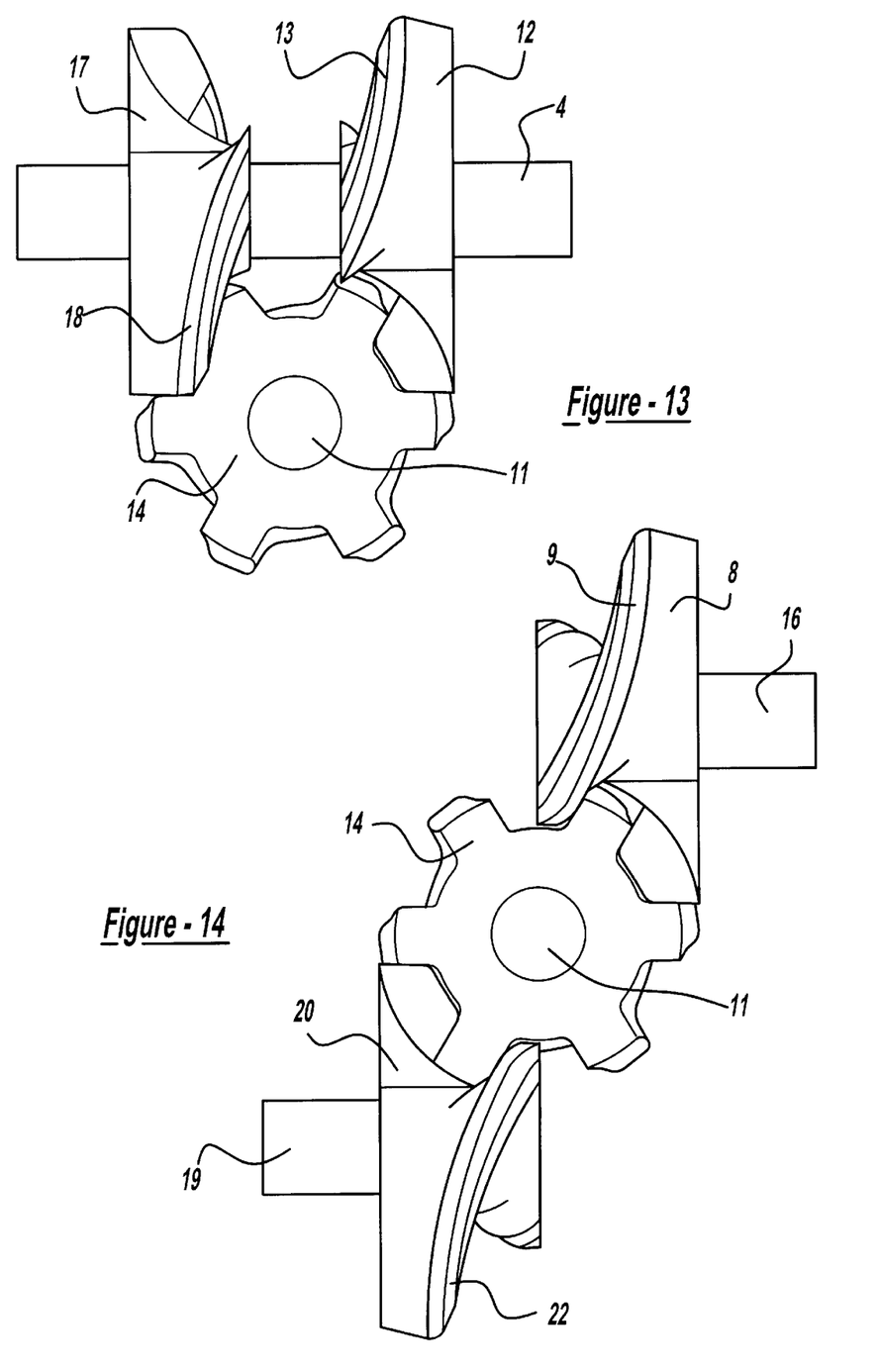
FIG. 13 shows a view of a worm/wormgear transmission with two modified worms placed on the same axis of rotation and connected to the same drive shaft.
FIG. 14 shows a view of a worm/wormgear transmission with two modified worms placed on the different axis of rotation.
Figure 25:
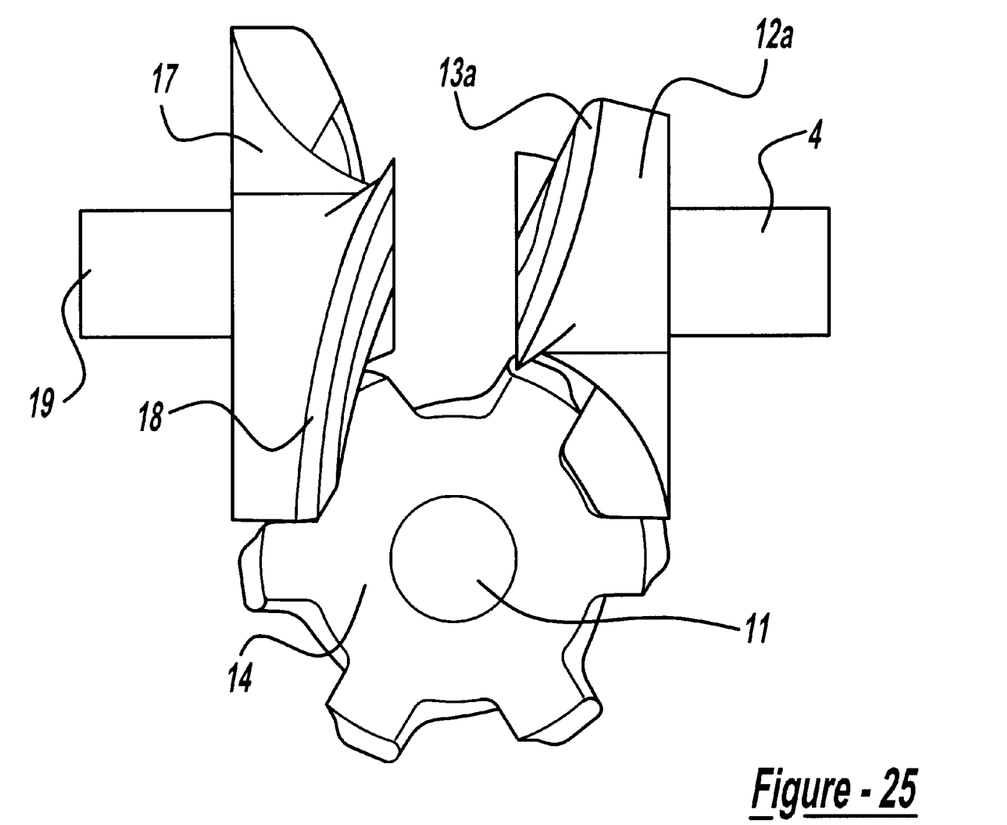
FIG. 25 shows a view of a worm/worm gear transmission with two modified worms placed on the same axis of rotation and connected to the same drive shaft with the modified worms having different angular thread phase.

FIG. 13 shows a view of a worm/wormgear transmission with two modified worms 12 and 17 in off-center positions placed on the same axis of rotation and connected to the same drive shaft 4. FIG. 25 shows a similar worm/worm gear transmission as shown in FIG. 13 with the worms 12a, 17 having a different angular thread phase.

FIG. 14 shows a view of a worm/wormgear transmission with two modified worms 8 and 20 having worm threads 9 and 22 placed on the different axis of rotation and connected to the drive shafts 16 and 19.

FIG. 15 shows an enveloping worm gear with different profile of teeth, generated by enveloping thread 13 of worm 12.

Figure 16:
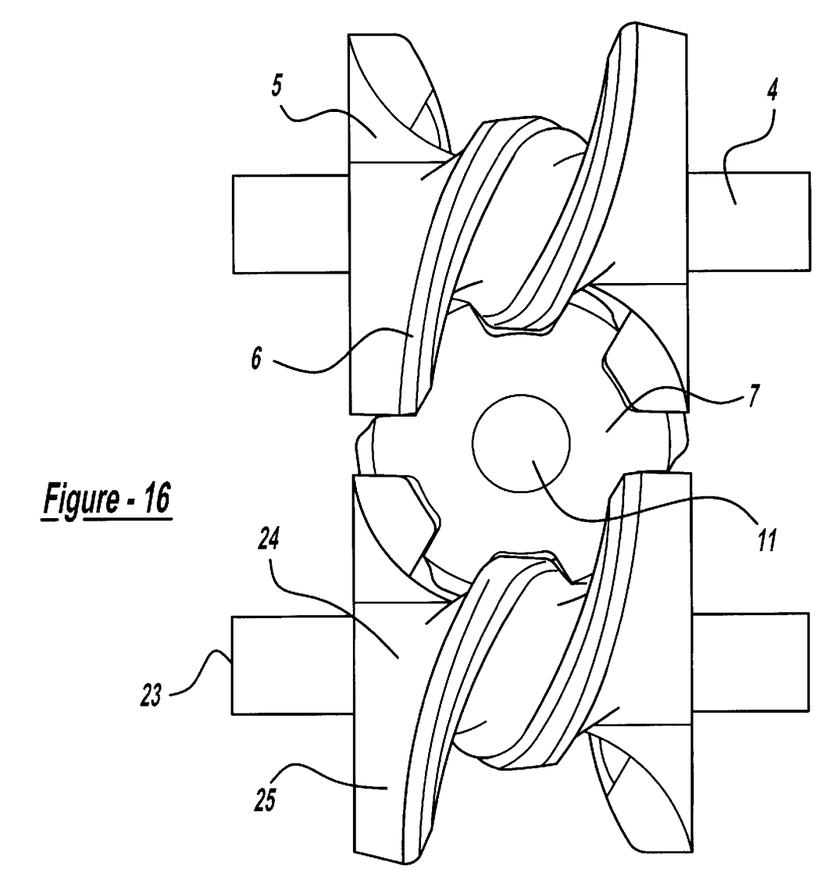
FIG. 16 shows a worm/worm gear transmission with two worms and having corresponding worm threads on different axes of rotation.

FIG. 16 shows a view of a worm/wormgear transmission with two worms 5 and 24 having corresponding worm threads 6 and 25 placed on different axes of rotation and which are connected to drive shafts 4 and 23.

Figure 17:
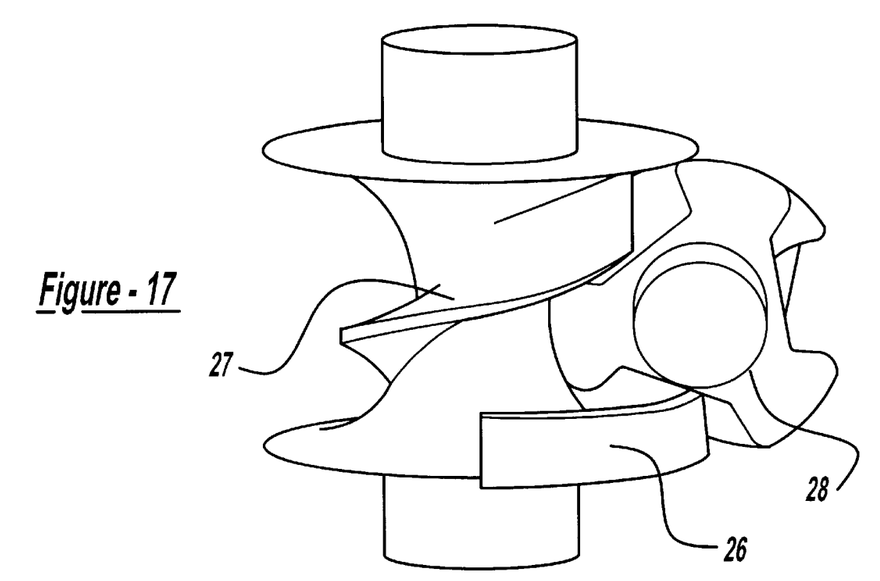
FIG. 17 shows 3D picture of worm/wormgear transmission with three worm gear teeth and big gap between worm's thread and worm gear teeth.

FIGS. 17 to 22 used for better illustration of different designs of worm/worm gear transmission. FIG. 17 shows a large gap between the worm thread 26 on the worm 27 and worm gear teeth 28 with purpose to able to look in gear mesh.

Figure 18:
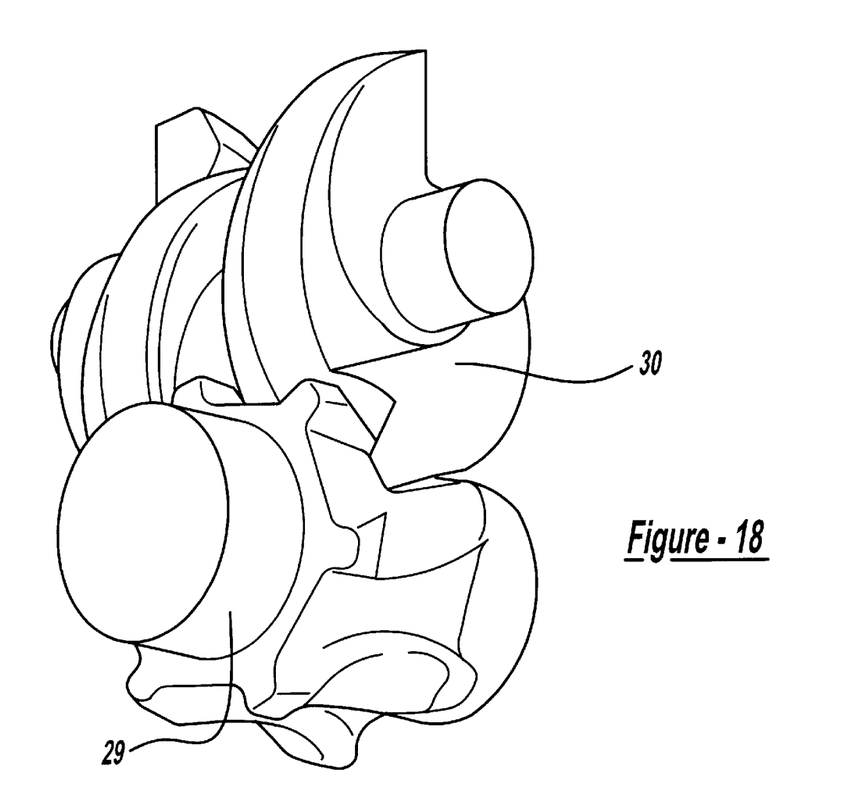
FIG. 18 shows 3D picture of worm/wormgear transmission with six worm gear teeth and two threads on the worm.

FIG. 18 shows enveloping six teeth worm gear 29 in mesh with two threads enveloping worm 30.

Figure 19:
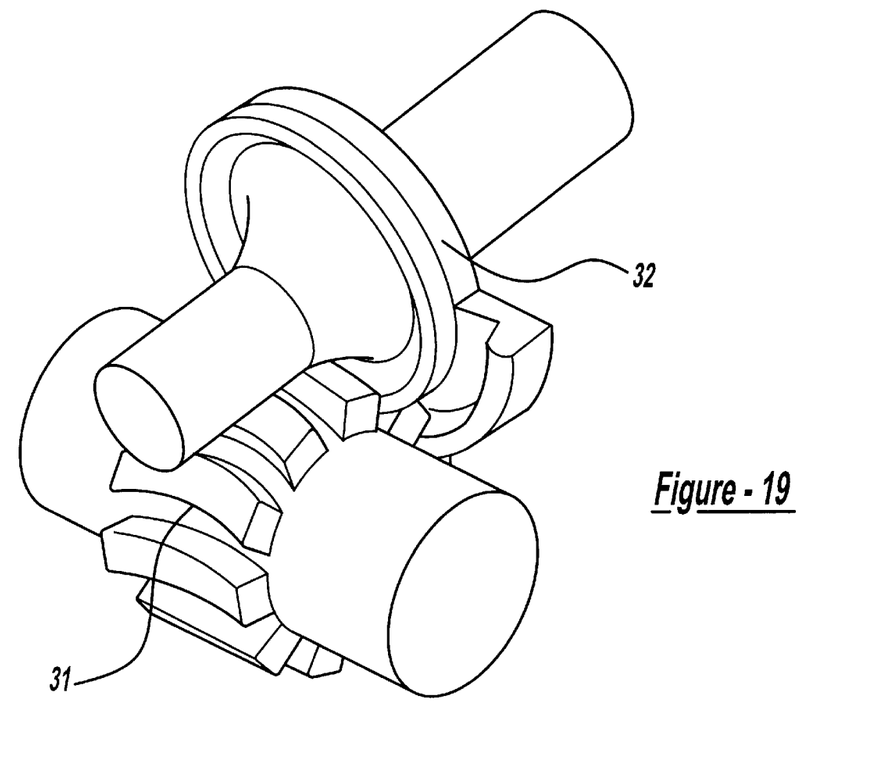
FIG. 19 shows 3D picture of worm/wormgear transmission with ten worm gear teeth with modified worm and modified worm gear.

FIG. 19 shows ten teeth worm gear 31 in mesh with modified enveloping worm 32 with one thread.

Figure 20:
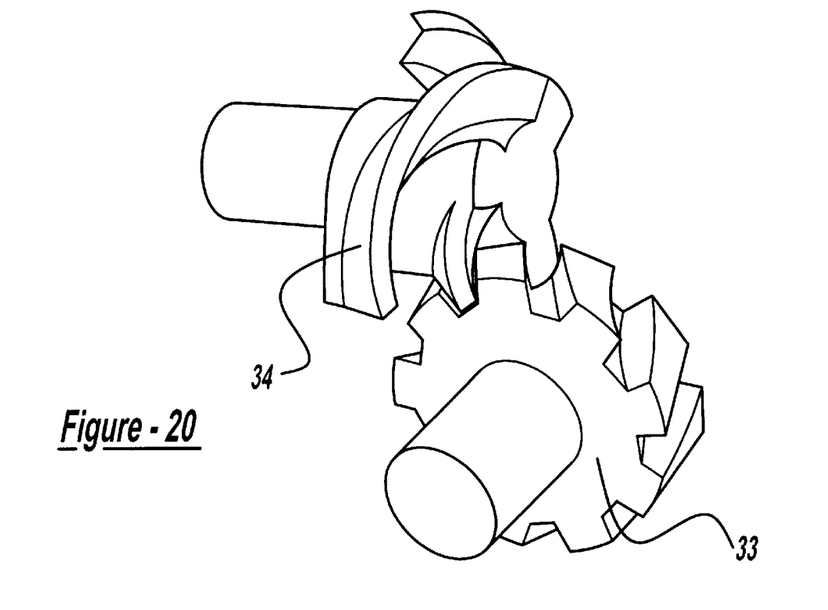
FIG. 20 shows 3D picture of worm/wormgear transmission with nine worm gear teeth with modified worm and modified worm gear and three threads on the worm.

FIG. 20 shows nine teeth modified worm gear 33 in mesh with modified enveloping worm 34 with three threads.

Figure 21:
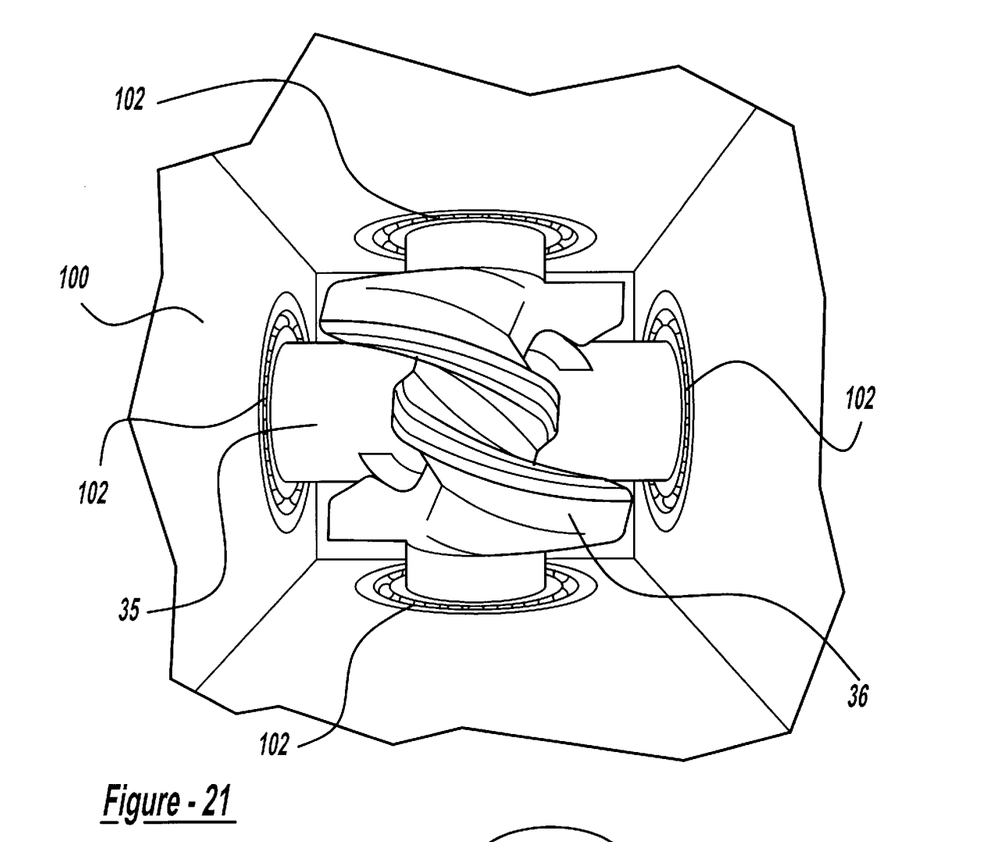
FIG. 21 shows picture of real steel worm/worm gear transmission with six worm gear teeth and two threads on the worm.

FIG. 21 shows six teeth steel worm gear 35 in mesh with steel enveloping worm 36 with two threads. The enveloping worm gear 35 and enveloping worm 36 are supported in a housing 100 by bearing assemblies 102.

Figure 22:
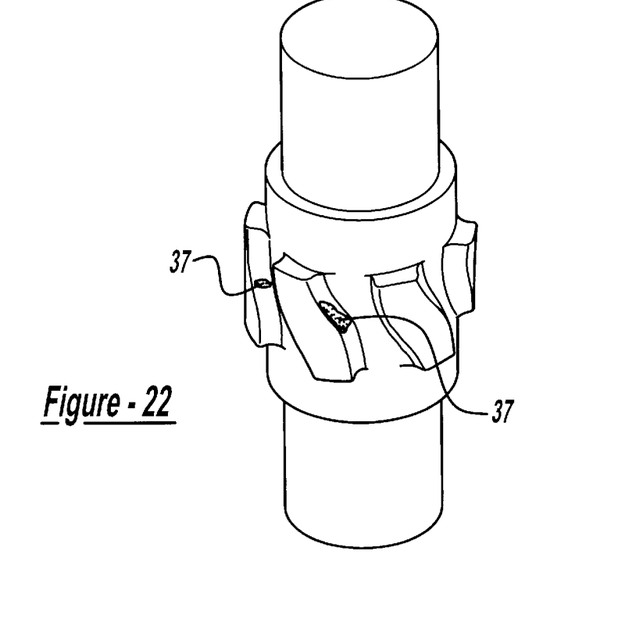

FIG. 22 shows six teeth steel worm gear 37 with two surface contact spots.

Figure 23:
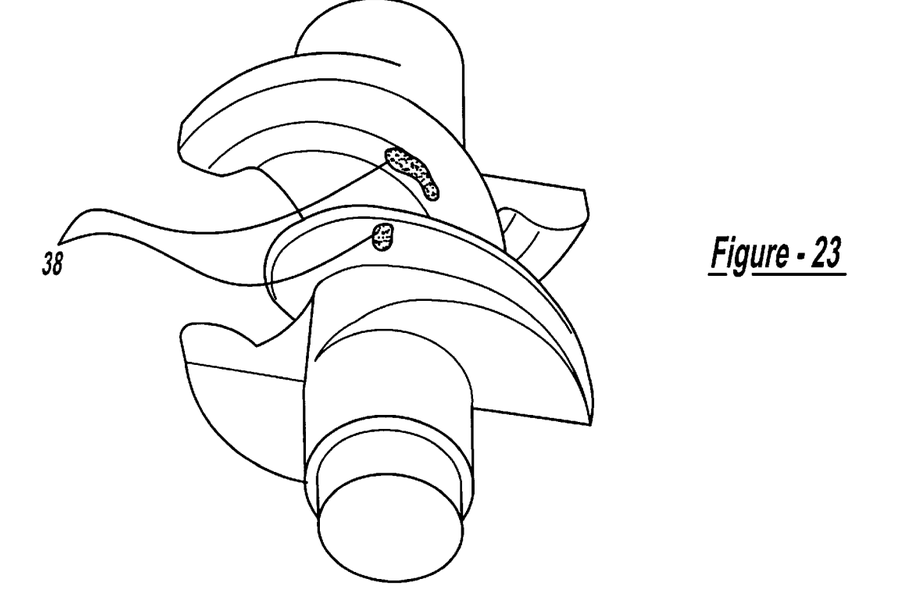
FIG. 23 shows 3D picture of the worm with two threads with spots on the surface from the contact with the worm gear in mesh.

FIG. 23 shows two threads steel worm 38 with two surface contact spots.

Figure 24:
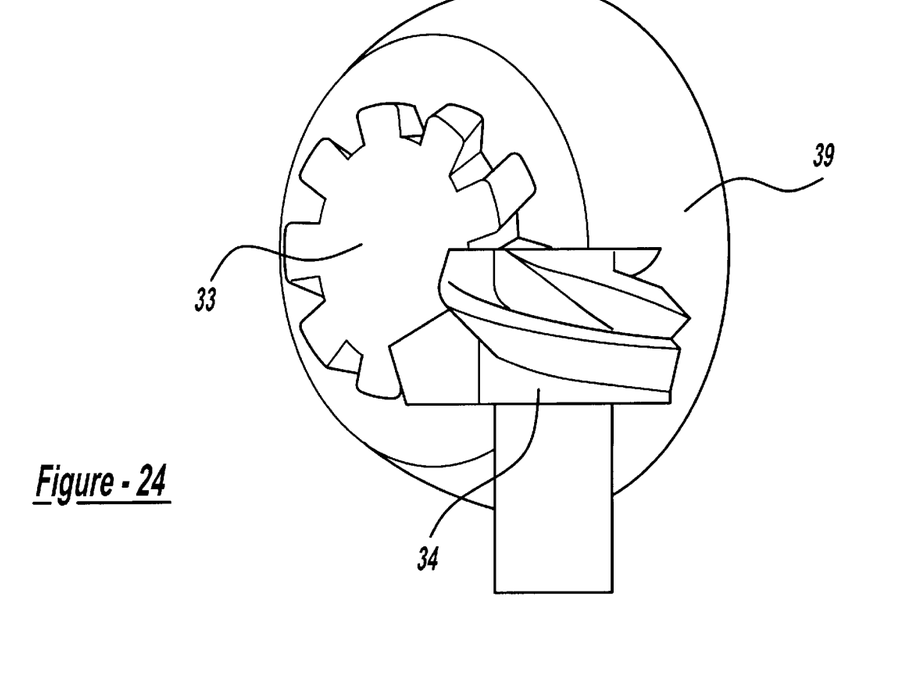
FIG. 24 shows a view of a worm/wormgear transmission with two worms placed on the different axis of rotation.

FIG. 24 is illustrates a new worm/worm gear transmission from FIG. 20 with hypoid gear 39. For the inventions described in the present patent application, these could be two different types of operations. When the worm/worm gear transmission does not have self-lock, the motion could be provided from the drive shaft through enveloping worm 2 (5) and enveloping-type worm gear 3 (7) to an output shaft 11 or back from output shaft 11 to drive shaft 4. The same operation is applicable for motion from the drive shafts 16 (19) to the drive shafts 11 (17) or back from drive shafts 11 (17) to drive shafts 16 (19) accordingly.

Alternately, when the worm/worm gear transmission does have self-lock, motion can be provided only from the drive shaft through enveloping worm 2 (5) and enveloping type worm gear 3 (7) to output shaft 11 (4). The same operation is possible only for motion from drive shafts 16 (19) to drive shaft 11 (17). Thus, transmissions shown in FIGS. 12, 14 and 16, with independent drive shafts connected to the worms, could be used in split-power transmission of a helicopter drive to transmit energy from a high-speed engine to a rotor drive shaft. In this case, worm gear 7 or worm gear 14 could be connected directly (or by gear train) to the helicopter rotor drive shaft, and worms could be connected to the output of the helicopter engine directly (or by gear train). In some designs of helicopter power train, the worm/worm gear transmission, of the present invention could replace bevel gears.

When modified worms connected to common shaft with different angular phase of threads, it means that in motion threads of worm going in mesh with worm gear teeth and out from the mash in different time. Purpose of it is to increase contact ratio and to provide smooth mesh.

According to this patent application, the greater enveloping angle for one revolution of the worm thread permits use of a worm gear teeth without undercut portions.

In one feature of the present invention, a worm and worm gear combination utilized to transmit rotation with the smallest ratio between the worm gear teeth and one worm thread. In the past, it has been believed that at least 24 teeth were required for a worm gear to be used with a worm combination. However, in the present invention, the big difference from the traditional worm/wormgear is not only in the number of teeth, but also in the enveloping angle of the worm thread, which is used for generation of the profile for the worm gear teeth. This enveloping angle can be $180^0$ for one revolution of the thread when the number of worm gear teeth is only 2.

In this invention, a self-locking worm/worm gear combination can have a worm gear to worm thread ratio that is preferably 10 and less.

Such a system is desirable so that each one of the worm and worm gear combinations described above can transmit very high torque loads when compared to prior inventive systems.

In the past, the worm and worm gears have been formed of materials having low coefficients of friction; worm gear was made only from bronze. In this however, the worm and worm gear could be made from a strong material such as steel. The preferable shape of the teeth and threads for the worm gear and the worm is shown in the drawings, but could be different. Even so, a worker of ordinary skill in the art would recognize that other shapes would come within the scope of this invention.

In the patent application, it is surface-to-surface contact between worm gear teeth and worm thread that increases the torque capacity of the enveloping worm/worm gear transmission. This became possible when the enveloping angle of the worm thread for generation of the worm gear teeth is more than 15 degrees, or even 30 degree.

Efficiency of new worm/worm gear transmission is equal or even greater than in well-known hypoid gearing, which used in right angle drives with low ratio. For back drive, when worm gear is a driven member and worm is a driving member this worm/worm gear transmission has also high efficiency, compare to hypoid gear set. It was confirmed by dyno testing of steel worm/worm gear transmission shows in FIG. 21. This invention can replace hypoid or bevel gearing in many applications. Lowest noise of worm/worm gear transmission compare with hypoid and bevel gear transmission making using of this new transmission more beneficial, in particularly in helicopter or car power train applications. For the same size, this invention has more than the twice capacity of hypoid gearing, where hypoid gear also has more than 24 teeth. Less number of teeth than in hypoid gear on the same circumference makes each tooth thicker and therefore stronger.

In the illustration shown in FIG. 24 we can see a modified worm 34 with three threads, which has shape and size similar to a pinion of a hypoid transmission. For the same size of the modified worm 34 and the pinion of hypoid gear 39 the diameter of the hypoid gear 39 twice than diameter of the worm gear 33. Up to now those skilled in the art were skeptical that enveloping type worm gear with less than 24 number of teeth would work and/or presented an insurmountable barrier in commercial applications.

If the invention were in fact obvious, because of its advantages, those skilled in the art surely would have implemented it by now.

Basic inventive system can be reconfigured into many different mechanical transmissions.

For example, it can be used in a front axle drive and differential drive real axle of a car, power windows, escalator drive and more.

What is claimed is:

1. A worm/worm gear transmission, comprising:
   an enveloping type worm gear with less than twenty-four teeth each having a tooth surface generated by a profile of an enveloping thread of a worm; and
   an enveloping worm having at least one screw thread that is engaged by at least one tooth of said worm gear.

2. The worm/worm gear transmission as recited in claim 1, wherein said tooth surface generated by said profile of said enveloping thread has an enveloping angle that is greater than 15 degrees for one revolution of said enveloping thread.

3. The worm/worm gear transmission as recited in claim 1, wherein said enveloping worm gear is engaged by teeth of a second worm located on an axis of rotation that is different from an axis of rotation for said worm.

4. The worm/worm gear transmission as recited in claim 2, wherein said enveloping thread for generation of said worm gear teeth is defined by a shortened portion of a thread having said enveloping angle greater than 15 degrees.

5. The worm/worm gear transmission as recited in claim 1, wherein said worm is connected to a drive shaft supporting said worm from one side.

6. The worm/worm gear transmission as recited in claim 1, wherein said worm gear is connected to a drive shaft supporting said worm gear from one side.

7. A worm/worm gear transmission as recited in claim 1, wherein said worm has a thread having less than one revolution.

8. The worm/worm gear transmission as recited in claim 7, wherein said worm is located in an off-center position with respect to said worm gear.

9. The worm/worm gear transmission as recited in claim 7, wherein said enveloping worm gear is engaged by teeth of a second enveloping worm.

10. The worm/worm gear transmission as recited in claim 9, wherein said second enveloping worm is located on a different axis of rotation from that of said enveloping worm.

11. The worm/worm gear transmission as recited in claim 9, wherein worms are located on opposite sides of said worm gear.

12. The worm/worm gear transmission as recited in claim 9, wherein said worms are located on a common axis of rotation.

13. A worm/worm gear transmission as recited in claim 9, wherein said worms are located on different axes of rotation.

14. A worm/worm gear transmission as recited in claim 10, wherein said worms are connected to independent drive shaft.

15. A worm/worm gear transmission is recited in claim 12, wherein said worms are connected to a common drive shaft.

16. A worm/worm gear transmission is recited in claim 15, wherein said worms are connected to said common drive shaft with different angular phase of threads.

17. The worm/worm gear transmission according to claim 1, further comprising a housing for supporting said enveloping worm in engagement with said worm gear.

18. The worm/worm gear transmission according to claim 17, further comprising bearings for supporting said enveloping worm and said worm gear in said housing.

* * * * *